(12) United States Patent
Perisho

(10) Patent No.: US 11,773,702 B2
(45) Date of Patent: Oct. 3, 2023

(54) MOTOR BEARING WITH ANTI-ROTATION SPRING FOR ELECTRICAL SUBMERSIBLE WELL PUMP

(71) Applicant: Baker Hughes Oilfield Operations LLC, Houston, TX (US)

(72) Inventor: Randal Perisho, Tulsa, OK (US)

(73) Assignee: BAKER HUGHES OILFIELD OPERATIONS LLP, Houston, TX (US)

( * ) Notice: Subject to any disclaimer, the term of this patent is extended or adjusted under 35 U.S.C. 154(b) by 176 days.

(21) Appl. No.: 17/162,503

(22) Filed: Jan. 29, 2021

(65) Prior Publication Data

US 2021/0238969 A1     Aug. 5, 2021

Related U.S. Application Data

(60) Provisional application No. 62/967,756, filed on Jan. 30, 2020.

(51) Int. Cl.
    *E21B 43/12*      (2006.01)
    *H02K 5/132*     (2006.01)
    (Continued)

(52) U.S. Cl.
    CPC ............ *E21B 43/128* (2013.01); *F04D 13/10* (2013.01); *H02K 5/132* (2013.01); *H02K 5/161* (2013.01)

(58) Field of Classification Search
    CPC ...... E21B 43/128; H02K 5/132; H02K 5/161; H02K 7/08; H02K 7/003; F04D 13/10;
(Continued)

(56) References Cited

U.S. PATENT DOCUMENTS

| 5,128,573 A | 7/1992 | Liu et al. |
| 5,884,949 A * | 3/1999 | Leon ..................... G09F 3/0317 |
| | | 292/307 R |

(Continued)

FOREIGN PATENT DOCUMENTS

| CN | 101605966 A | 12/2009 |
| JP | 2018527720 A | 9/2018 |

(Continued)

OTHER PUBLICATIONS

WO2018222682A1 English translation (Year: 2022).*
International Search Report and Written Opinion of PCT Application No. PCT/US2021/070100 dated May 11, 2021: pp. 1-8.

*Primary Examiner* — Christopher M Koehler
*Assistant Examiner* — Viswanathan Subramanian
(74) *Attorney, Agent, or Firm* — Bracewell LLP; Keith R. Derrington

(57) ABSTRACT

A submersible pump electrical motor has a bearing hub between adjacent rotor sections. The bearing hub has a hub outward facing sidewall and a hub inward facing hub sidewall through which the shaft extends. A collar having a collar inward facing sidewall is rigidly mounted to the hub outward facing sidewall. The collar has a collar outward facing sidewall spaced from stator sidewall by an annular clearance. A slit in the collar extends from the collar inward facing sidewall to the collar outward facing sidewall. An anti-rotation spring has a supporting portion inwardly biased against the hub outward facing sidewall and a locking portion protruding outward through the slit into engagement with the groove to prevent rotation of the hub and the collar.

13 Claims, 5 Drawing Sheets

(51) Int. Cl.
*F04D 13/10* (2006.01)
*H02K 5/16* (2006.01)

(58) Field of Classification Search
CPC ...... F04D 29/047; F16C 17/02; F16C 17/107; F16C 2300/42; F16C 2360/44; F16C 2380/26; F16C 32/047; F16C 32/0497; F05D 2260/38
See application file for complete search history.

(56) References Cited

U.S. PATENT DOCUMENTS

| | | | |
|---|---|---|---|
| 6,956,310 B1 | 10/2005 | Knox | |
| 8,201,532 B2 | 6/2012 | Prokop | |
| 9,438,089 B2 | 9/2016 | Perisho et al. | |
| 10,658,767 B2 | 5/2020 | Koellmann et al. | |
| 2010/0239447 A1* | 9/2010 | Bush | F16C 33/201 384/295 |
| 2014/0056548 A1* | 2/2014 | Kodama | F16C 17/107 384/119 |
| 2015/0256043 A1 | 9/2015 | Perisho et al. | |

FOREIGN PATENT DOCUMENTS

| | | | | |
|---|---|---|---|---|
| WO | 2014070522 A1 | 5/2014 | | |
| WO | WO-2018222682 A1 * | 12/2018 | ............. | F16C 27/02 |

* cited by examiner

MOTOR BEARING WITH ANTI-ROTATION SPRING FOR ELECTRICAL SUBMERSIBLE WELL PUMP

CROSS-REFERENCE TO RELATED APPLICATION

This application claims priority to provisional application S.N. 62/967,756, filed Jan. 30, 2020.

FIELD OF THE DISCLOSURE

This disclosure relates in general to submersible well pump motors and in particular to a motor bearing having a V-shaped anti-rotation spring.

BACKGROUND

Electrical submersible pump (ESP) motors can be very long and small in diameter. To obtain sufficient horsepower, multiple rotor sections are mounted on the same shaft inside the stator with radial support bearings between each rotor section and on each end of the rotor stack. These bearings comprise a bearing sleeve mounted on and rotating with the shaft and a corresponding carrier body. One type of motor uses a T-shaped elastomeric ring mounted to the carrier body. The elastomeric ring frictionally engages the inner diameter of the stator, preventing rotation of the carrier body.

While elastomeric rings are successful, in some wells the temperatures are high enough to degrade the elastomeric material. Metal anti-rotation members are known, but improvements are desired.

SUMMARY

A submersible pump electrical motor has a stator with a stator bore defining an inward facing stator sidewall with an axially extending groove, relative to a longitudinal axis of the motor. A shaft extends through the bore along the axis. First and second rotor sections mount to the shaft for rotation therewith. A bearing hub between the first and second rotor sections has a hub outward facing sidewall and a hub inward facing hub sidewall through which the shaft extends. A collar having a collar inward facing sidewall rigidly mounts to the hub outward facing sidewall. The collar has a collar outward facing sidewall spaced from stator sidewall by an annular clearance. A slit in the collar extends from the collar inward facing sidewall to the collar outward facing sidewall. An anti-rotation spring has a supporting portion inwardly biased against the hub outward facing sidewall and a locking portion protruding outward through the slit into engagement with the groove to prevent rotation of the hub and the collar.

The supporting portion may be curved at a same curvature as the hub outward facing sidewall and be in flush contact with the hub outward facing sidewall. In the embodiment shown, the supporting portion comprises a pair of parallel inward curved supporting tangs. The locking portion comprises an outward curved locking tang located between and joined to the supporting tangs.

The collar has first and second ends facing axially in opposite directions. In the embodiment shown, a depression is formed in the second end of the collar circumferentially spaced from the slit. A tab protrudes from the supporting portion and locates in the depression to stop axial movement of the spring in a direction from the second end toward the first end of the collar.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
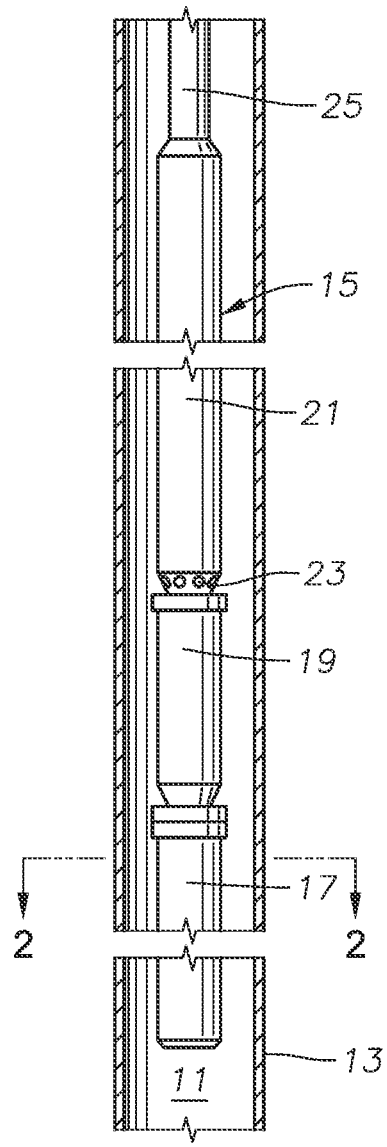
FIG. 1 is a side view of an electrical submersible pump (ESP) assembly in accordance with this disclosure and installed in a well.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. An electrical submersible pump assembly (ESP) 15 is suspended in well 11 to pump well fluid from well 11. Although shown installed vertically, ESP 15 could be located within an inclined or horizontal section of well 11, or it could be located exterior of well 11 for boosting the pressure of well fluid flowing from the well. Consequently, the terms "upper", "lower" and the like are used only for convenience.

ESP 15 includes a motor 17, normally a three-phase electrical motor. A power cable (not shown) extends into well 11 and connects to motor 17 for supplying power. A seal section 19 connects to motor 17 if ESP 15 is submersed. Seal section 19 has components, such as a bladder or bellows, for reducing a pressure differential between dielectric lubricant contained in motor 17 and the hydrostatic pressure of the well fluid in well 11. Although shown above motor 17, the pressure equalizing components of seal section 19 could be mounted to a lower end of motor 17.

A pump 21 connects to the opposite end of seal section 19. Pump 21 may be a centrifugal pump with numerous stages, each stage having an impeller and a diffuser. Alternately, pump 21 may be a progressing cavity pump, having a helical rotor that rotates within an elastomeric stator. Pump 21 could also be a reciprocating type. Pump 21 has an intake 23 for drawing in well fluid. A gas separator (not shown) may be mounted between motor 17 and pump 21, and if so, intake 23 would be located in the gas separator. A string of production tubing 25 suspends ESP 15 in casing 13 in most installations. Alternately, a string of coiled tubing could support ESP 15. In that instance, pump 21 would discharge into an annulus surrounding the coiled tubing. The power cable would be located inside the coiled tubing, and the motor would normally be above the pump.

Figure 2:
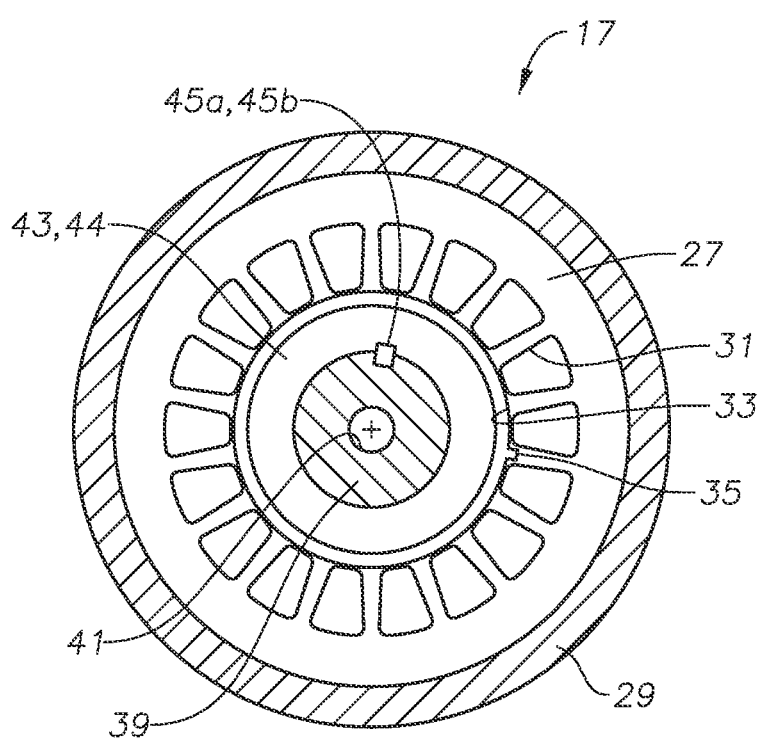
FIG. 2 is a partially schematic sectional view of the motor of the ESP of FIG. 1, taken along the line 2-2 of FIG. 1.

Referring to FIG. 2, motor 17 has a stator 27 that is fixed in a motor housing 29. Stator 27 may be conventional and is made up of a plurality of laminations, which are thin steel disks having slots 31 through which windings (not shown) are inserted. Stator 27 has an inner diameter or bore 33. A groove 35 formed in stator bore 33 extends parallel with a longitudinal axis 37 of housing 29.

A shaft 39 extends through stator bore 33 along axis 37. Shaft 39 may have an axial passage 41 for distributing a dielectric lubricant. Several rotor sections 43 are mounted to shaft 39 for rotation therewith, each by a key 45 that engages mating keyways in shaft 39 and each rotor section 43.

Figure 3:
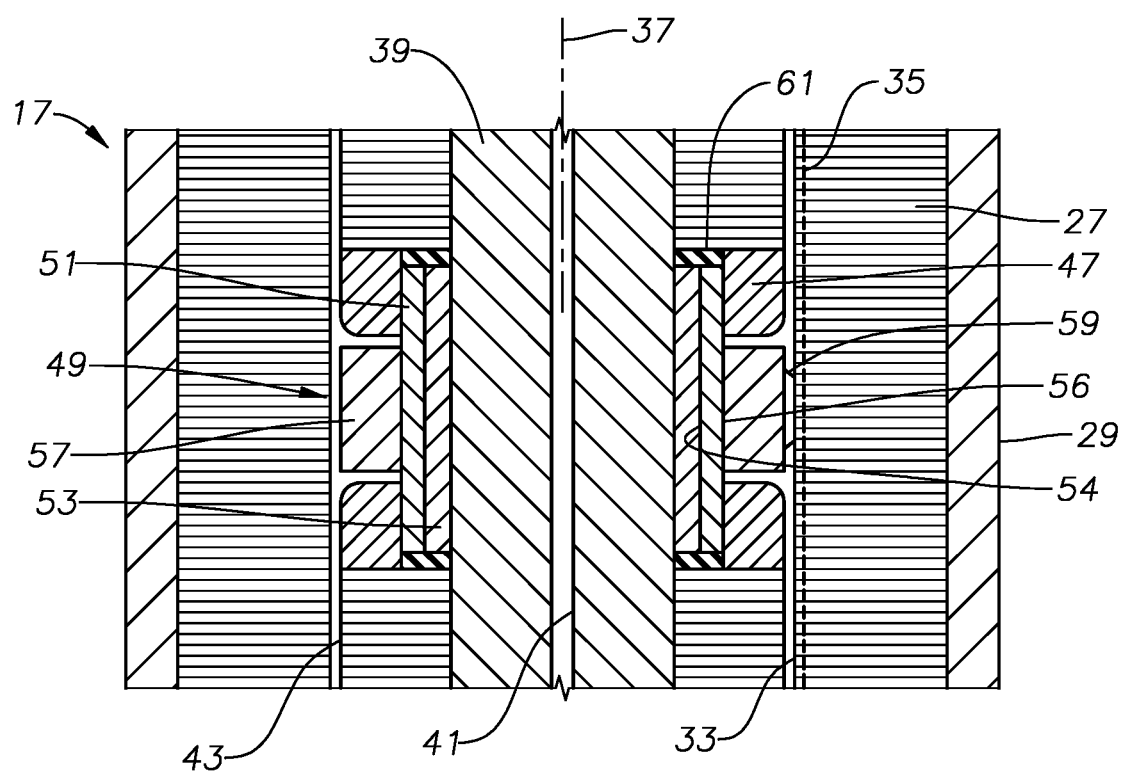
FIG. 3 is a partly schematic axial sectional view of the motor of FIG. 2, illustrating a bearing between two of the rotor sections.

Portions of two of the rotor sections 43 are shown in FIG. 3. Each rotor section 43 may be conventional and is made up of laminations, which are thin steel disks. In this example, copper rods (not shown) extend axially through the rotor laminations and are spaced around axis 37. The rotor laminations and the ends of the copper rods may be secured together by a copper end ring 47 at each end of each rotor section 43. As an alternate to copper rods, permanent magnets may be employed in each rotor section 43. Rotor sections 43 may be free to move small increments axially relative to shaft 39 in response to thermal growth. As an example only, each rotor section 43 may be about a foot or so in length, and motor 17 may be up to 30 feet in length or more.

Figure 5:
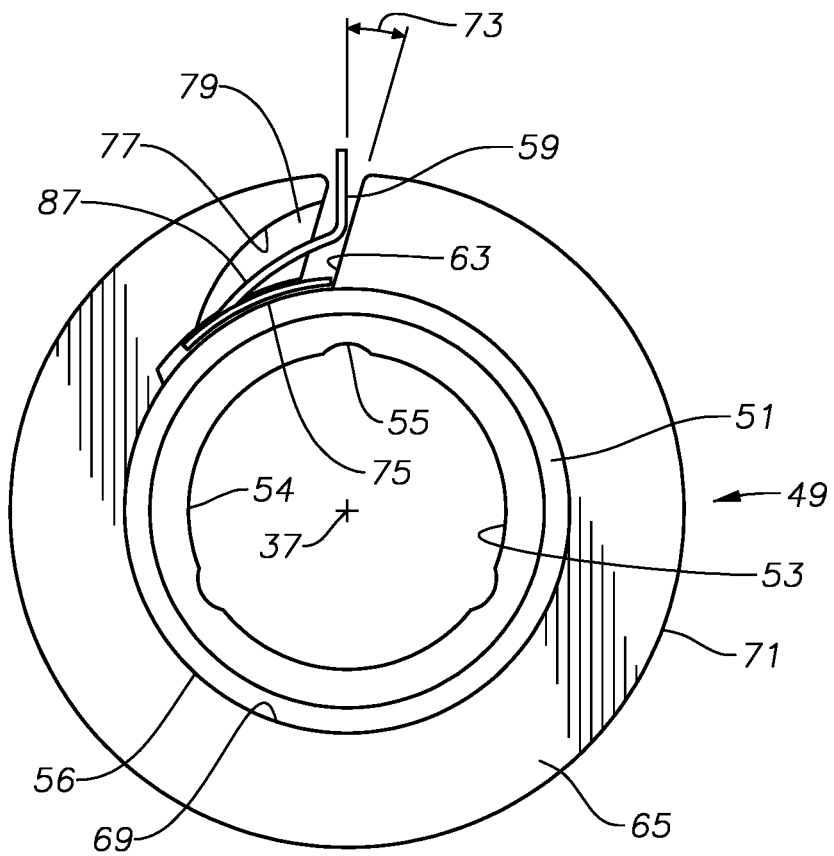
FIG. 5 is an end view of the bearing of FIG. 4.
Figure 6:
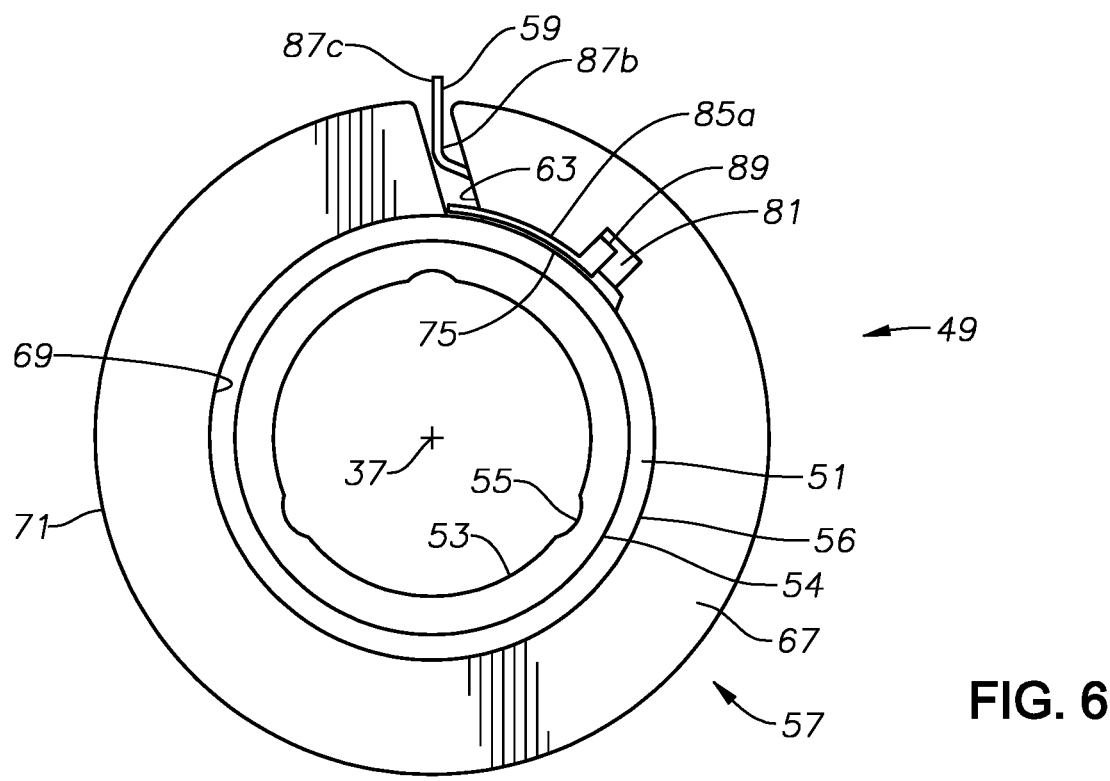
FIG. 6 is an opposite end view of the bearing of FIG. 4

A radial bearing 49 locates between each of the rotor sections 43 to radially stabilize shaft 39 during rotation. Bearing 49 has a tubular hub 51 that has a sleeve, core or liner 53 secured within its inner diameter or inward facing sidewall 54 in this example. Hub 51 and liner 53 are rigidly joined to each other, such as by an interference fit. In this example, shaft 39 extends through and is in sliding rotational engagement with a bearing surface of liner 53. The bearing surface may be of a tri-lobe design having three lubricant channels 55 extending parallel with axis 37, as shown in FIG. 5. The portions of the tri-lobe design between lubricant channels 55 are arcuate.

Optionally, rather than a continuous key 45 that extends through all of the rotor sections 43, each rotor section 43, 44 engages shaft 39 with a separate key 45a, 45b (FIG. 2). Key 45a of the first rotor section 43 and the mating keyway in shaft 39 have a lower end that terminates at the upper or first end of hub 51. Key 45b and the mating keyway in shaft 39 of the second rotor section 44 have an upper end that terminates at the lower or second end of hub 51. The portion of shaft 39 within bearing 49 is free of any keys 45 and keyways. The cylindrical surface of shaft 39 that is engaged by hub liner 53 is smooth and uninterrupted by keyway slots.

Hub 51 has a cylindrical outer diameter or outward facing sidewall 56 that is inserted, such as by a press-fit, into a collar 57. Collar 57 has a cylindrical outer surface spaced inward from stator bore 33 by an annular clearance. An anti-rotation spring 59 mounted with collar 57 is biased radially outward into engagement with stator bore groove 35. This engagement prevents rotation of collar 57, hub 51 and liner 53 as shaft 39 rotates. The axial dimension of collar 59 is less than the distance between end rings 47 of adjacent rotor sections 43. Hub 51 and its liner 53 are longer than the axial dimension of collar 59 and extend within the inner diameters of rotor section end rings 47. Thrust washers 61 may be located between each end of hub 51 and adjacent rotor sections 43.

Figure 4:
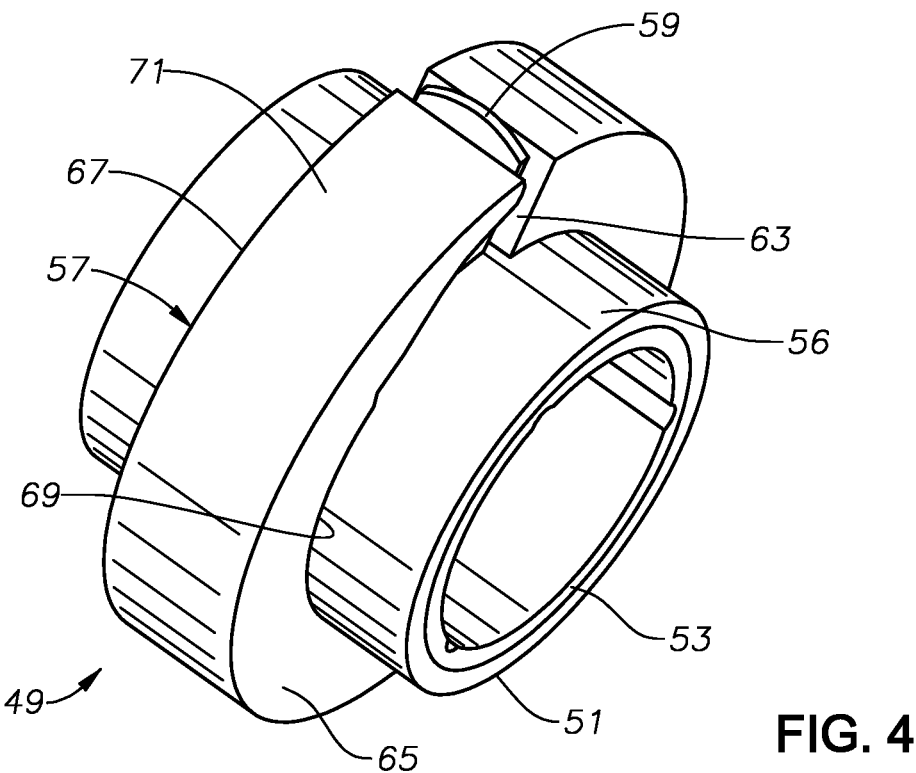
FIG. 4 is an isometric view of the bearing of FIG. 3, shown removed from the motor.

Referring to FIG. 4, bearing collar 57 has a single slit 63 through which a portion of spring 59 protrudes. Slit 63 extends axially from a first end 65 to a second end 67 of collar 57. First end 65 faces axially in an opposite direction from second end 67 and could be either the upper or lower side. Referring also to FIG. 5, slit 63 also extends from the inward facing cylindrical sidewall 69 of collar 57 to the outward facing cylindrical sidewall 71 if collar 57. The inner end of slit 63 terminates at hub outer diameter 56. Slit 63 may be machined into collar 57 after inward facing sidewall 69 has been press-fit over outer diameter 56 of hub 51. However, slit 63 may be molded in place by various manufacturing processes, such as by compression, powder metal, or casting. Slit 63 has parallel sides that face each other. In this example, slit 63 is not on a radial line of axis 37. It is at an acute angle 73 relative to a radial line emanating from axis 37 and passing through slit 63.

Referring also to FIGS. 6 and 8-10, a recess 75 extends from slit 63 in a circumferential direction a selected distance that may be about 40 degrees. Recess 75 is formed in collar inward facing sidewall 69 and creates a curved cavity between hub outer diameter 56 and collar 57.

Collar 57 also has a curved access wall 77 that extends inward from near the outer side of slit 63. Access wall 77 is partially cylindrical but has a center point offset from axis 37. Access wall 77 has an inner end that joins recess 75 a selected distance from the end of recess 75 opposite the recess end that joins slit 63. Access wall 77 provides space between it and one of the sides of slit 63 to facilitate the insertion of anti-rotational spring 59. Access wall 77 extends axially from collar first end 65 toward collar second end 67, but terminates before reaching collar second end 67.

The termination of access wall 77 results in a shelf 79 with a flat surface that faces in the same direction as collar first end 65. Shelf 79 extends from slit 63 a circumferential distance to the inner end of access wall 77.

Figure 9:
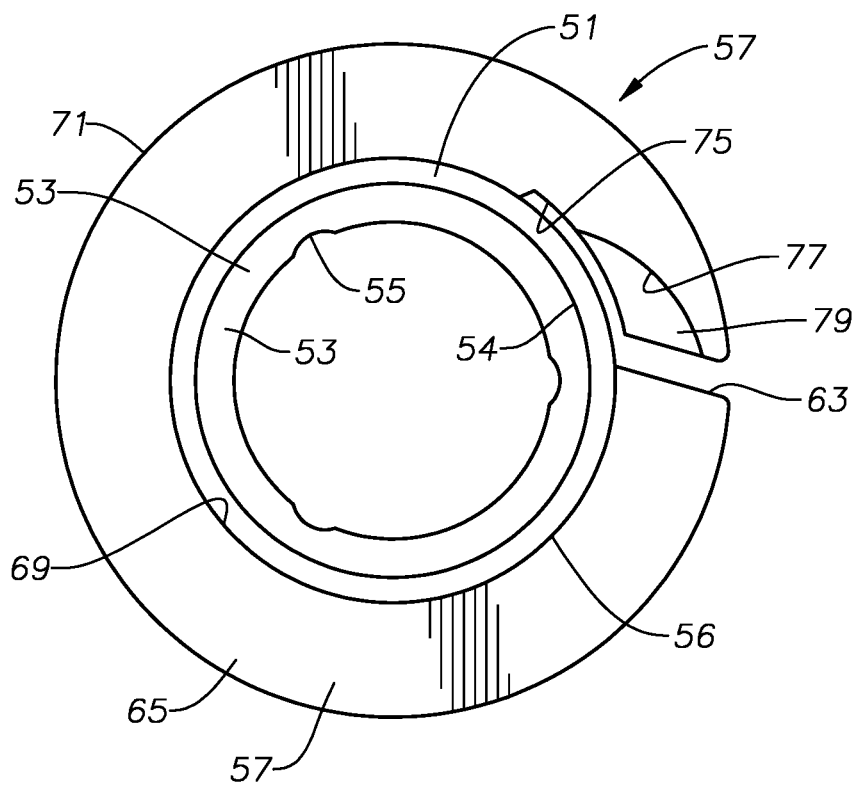
FIG. 9 is an end view of the bearing of FIG. 4, with the anti-rotation spring removed.
Figure 10:
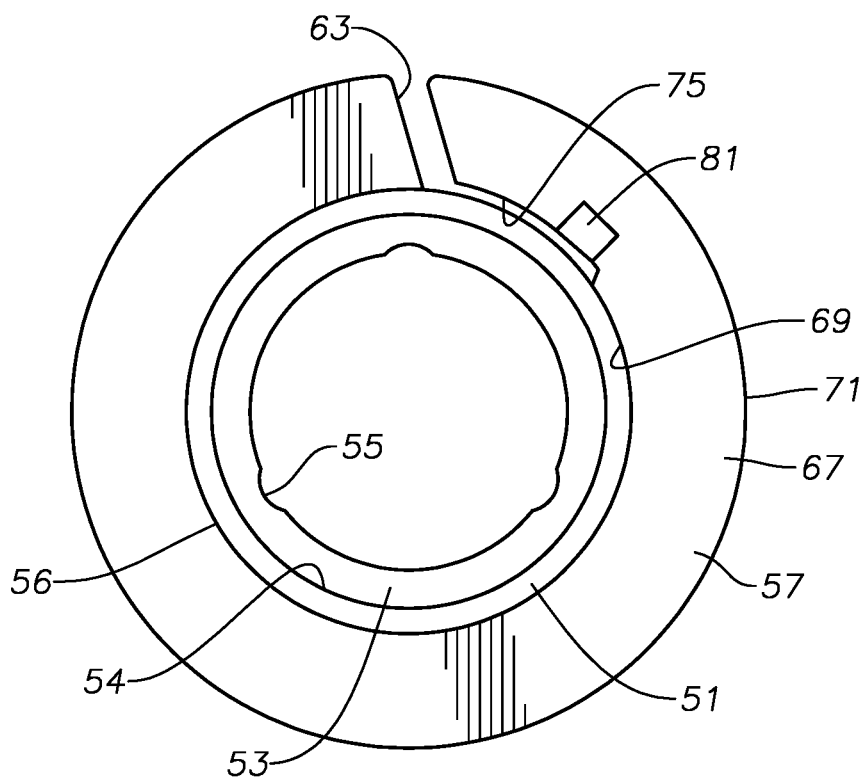
FIG. 10 is an opposite end view of the bearing of FIG. 4, with the anti-rotation spring removed.

As shown in FIG. 10, a hole or depression 81 is formed in collar second end 67 at the end of recess 75. Depression 81 does not extend the full axial distance to collar first end 65 (FIG. 9) and has a bottom or base that faces in the same direction as collar second end 67.

Figure 7:
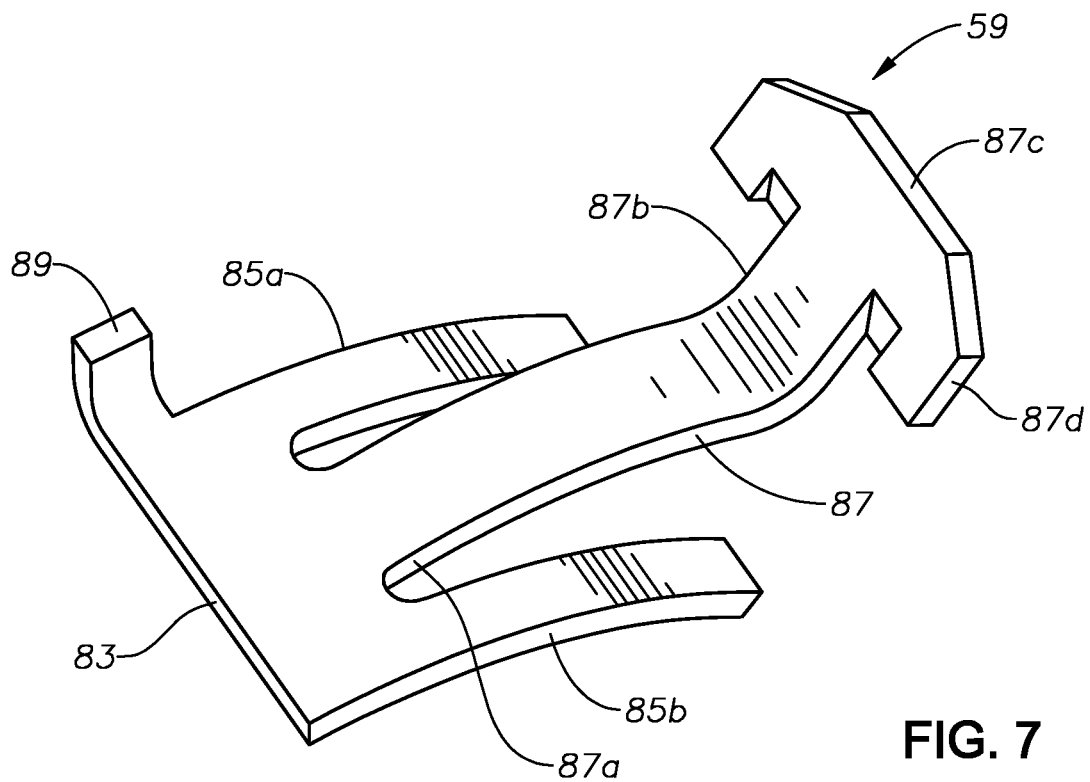
FIG. 7 is an enlarged isometric view of an anti-rotation spring of the bearing of FIG. 5.
Figure 8:
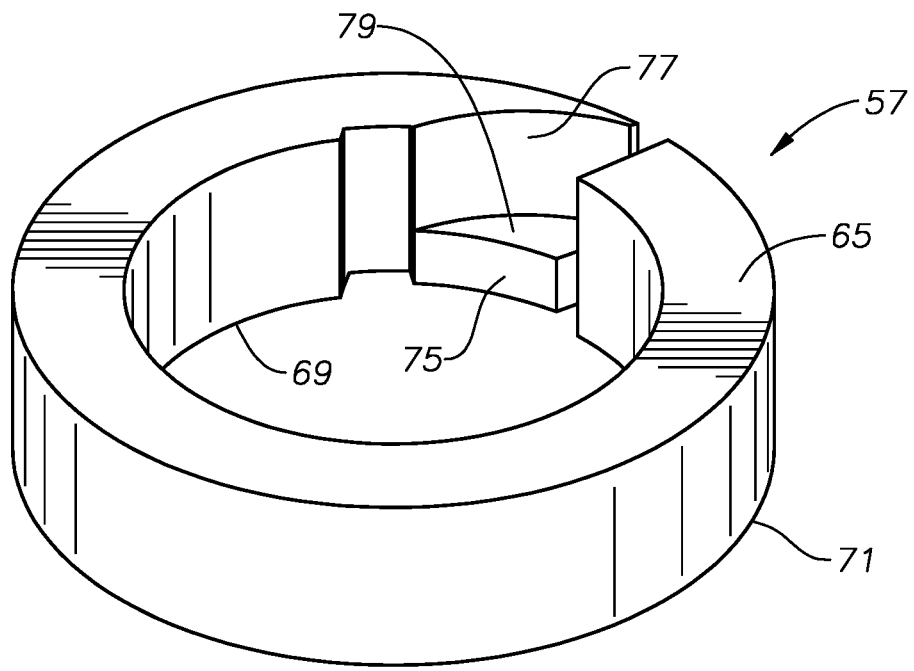
FIG. 8 is an isometric view of a collar of the bearing of FIG. 4, with the hub and anti-rotation spring removed.

Referring to FIG. 7, anti-rotation spring 59 is a single-piece resilient member. Spring 59 has a straight-edged base 83 with supporting tangs 85a, 85b extending therefrom. Supporting tangs 85a, 85b are elongated beam-like members with a curvature that is the same as the radius of hub outer diameter 56 (FIG. 9). Supporting tangs 85a, 85b are spaced apart from each other.

A locking tang 87 joins base 83 between supporting tangs 85a, 85b. Locking tang 87 and supporting tangs 85a, 85b are resilient and cantilevered from base 83. Locking tang 87 has a curved inner portion 87a that curves outward from base 83 at an angle that forms a V-shaped configuration with supporting tangs 85a, 85b. The curved inner portion 87a joins a curved outer portion 87b that curves outwardly from curved inner portion 87a. An outer portion or head 87c joins curved outer portion 87b. Head 87c is flat in this example and has ears 87d on opposite sides. The width of head 87c may be greater than the widths of locking tang inner and outer portions 87a, 87b. A tab 89 joins one end of base 87 and protrudes outward.

To install anti-rotation spring 59 in collar 57 in one technique, a technician will resiliently flex locking tang 87 into slit 63 at collar second end 67, then push spring 59 toward collar first end 65. Supporting tangs 85a, 85b will slide into recess 75 and bear against hub outer diameter 56. During insertion, once locking tang 87 passes shelf 79, it will snap resiliently outward into the recess formed by access wall 79. Tab 89 will then enter depression 81, stopping further movement of spring 59 toward collar first end 65. The engagement of locking tang inner portion 87a with shelf 79 prevents any axial movement of spring 59 in the opposite direction, toward collar second end 67. An edge of locking tang inner portion 87b may be in contact with shelf 79 after installation. The engagement of tab 89 with depression 81 and the location of tang inner portion 87a relative to shelf 79 thus retain anti-rotation spring 59 with collar 57.

Hub 51 and liner 53 may be formed of materials selected to accommodate the different coefficients of thermal expansion (CTE) of shaft 39, normally carbon steel, and the steel laminations of stator 27. When motor 17 heats up, shaft 39 may get hotter than stator 27 and extend in overall length relative to stator 27. The unequal thermal growth can result in bearings 49 locking up. As an example only, hub 51 may be formed of a stainless steel and liner 53 of a graphite material. Even though stainless steel of a desired CTE may be magnetic, some types, such as 329SS or 434SS powder metal materials, do not tend to get hot in response to the electromagnetic fields of the stator. Those stainless steel materials have desirable CTE's between 7 and 8.5 micro inch per inch. A suitable graphite material for liner 53 may have a CTE of about 4.4. Collar 57 could also be made of a powder material, such as 434SS or 439SS, neither of which gets hot in a magnetic field.

While the disclosure has been shown in only one of its forms, it should be apparent to those skilled in the art that various changes may be made.

The invention claimed is:

1. A submersible pump electrical motor, comprising:
a stator having a stator bore defining an inward facing stator sidewall with an axially extending groove, relative to a longitudinal axis of the motor;
a shaft extending through the bore along the axis;
first and second rotor sections mounted to the shaft for rotation therewith;
a bearing hub between the first and second rotor sections, the bearing hub having a hub outward facing sidewall and a hub inward facing hub sidewall;
a collar comprising,
a collar inward facing sidewall rigidly mounted to the hub outward facing sidewall,
a collar outward facing sidewall spaced from stator sidewall by an annular clearance,
first and second ends facing axially in opposite directions,
a recess extending a partial circumferential distance in the collar inward facing sidewall,
a slit that extends from the recess to the collar outward facing sidewall;
a curved access wall radially outward from the recess and extending from the first end toward the second end of the collar, the access wall beginning at the slit and extending a partial circumferential distance from the slit; and
a shelf extending from the access wall to the slit, the shelf being located between the first and second ends of the collar and facing in a direction toward the first end of the collar;
an anti-rotation spring having at least one supporting tang in abutment with the hub outward facing sidewall and a locking tang that extends adjacent to the supporting tang along a portion of a circumference of the hub, is biased radially outward by the supporting tang, and has an outer portion that extends through the slit into engagement with the groove, the locking tang having an edge, so that when the spring tends to move in a direction from the first end toward the second end of the collar, the edge abuts the shelf.

2. The motor according to claim 1, wherein:
the supporting tang comprises two supporting tangs;
the locking tang is located between the supporting tangs; and wherein the spring further comprises:
a base connecting ends of the locking tang and the supporting tangs to each other.

3. The motor according to claim 1, wherein the collar has first and second ends facing axially in opposite directions and further comprises:
a depression formed in the second end of the collar circumferentially spaced from the slit; and
a tab that protrudes from the supporting tang and locates in the depression to stop movement of the spring in a direction from the second end toward the first end of the collar.

4. The motor according to claim 1, wherein:
the access wall is curved about a center point that is spaced from the axis.

5. The motor according to claim 1, wherein:
the slit extends from the inward facing sidewall of the collar at a first angular location about the axis to the outward facing sidewall of the collar at a second angular location about the axis that is offset from the first angular location, so that the slit extends along a path that is at an acute angle relative to a radial line emanating from the axis and passing through the slit.

6. The motor according to claim 1, further comprising:
a liner in the hub in non-rotating engagement with the hub inward facing hub sidewall,
the liner being in rotational, sliding engagement with the shaft; and wherein
the liner is of a graphite material and the hub of a stainless steel material.

7. The motor according to claim 1, further comprising:
a first key between the shaft and the first rotor section for causing the first rotor section to rotate with the shaft;
a second key between the shaft and the second rotation section for causing the second rotation section to rotate with the shaft; wherein
the first key has a second end terminating at a first end of the bearing hub;

the second key has a first end terminating second end of the bearing hub; and the shaft is free of a key in the space between the first and second rotor sections.

8. A submersible pump electrical motor, comprising:

a stator having a stator bore defining an inward facing stator sidewall with an axially extending groove, relative to a longitudinal axis of the motor;

a shaft extending through the bore along the axis;

first and second rotor sections mounted to the shaft for rotation therewith;

a bearing hub between the first and second rotor sections, the bearing hub having a hub outward facing sidewall and a hub inward facing hub sidewall through which the shaft extends;

a collar having a collar inward facing sidewall rigidly mounted to the hub outward facing sidewall and a collar outward facing sidewall spaced from stator sidewall by an annular clearance, the collar having first and second ends that face axially in opposite directions;

a slit in the collar that extends from the collar inward facing sidewall to the collar outward facing sidewall, the slit also extending from the first end to the second end of the collar;

an anti-rotation spring comprising:

a pair of parallel, curved supporting tangs in flush engagement with the hub outward facing sidewall;

a curved locking tang between the supporting tangs that is biased radially outward by the engagement of the supporting tangs with the hub outward facing sidewall; and the locking tang having an outer portion that extends through the slit into engagement with the groove to prevent rotation of the collar and the hub wherein each of the supporting tangs and locking tang have fixed ends that are joined together at an angular location along a circumference of the hub, free ends opposite the fixed ends, and extend adjacent and lateral to one another along a portion of the hub circumference between their fixed and free ends, wherein the supporting tangs have a same curvature as the outward facing side of the hub between their fixed and free ends, and wherein the locking tang depends radially away from the supporting tangs between its fixed end and free end.

9. The motor according to claim 8 further comprising a depression formed in the second end of the collar and circumferentially spaced from the slit; and a tab that protrudes from one of the supporting tangs and locates in the depression to stop movement of the spring in a direction from the second end toward the first end of the collar.

10. The motor according to claim 8, further comprising:

a curved recess extending a partial circumferential distance in the collar inward facing sidewall from the slit, one of the supporting tangs being positioned in the recess;

a curved access wall that joins and curves radially outward from the recess and extending from the first end toward the second end of the collar;

a shelf extending from the access wall to the slit, the shelf being located between the first and second ends of the collar and having a flat surface facing in a direction toward the first end of the collar; and wherein the locking tang has an edge that abuts the flat surface of the shelf if the spring tends to move in a direction from the first end toward the second end of the collar.

11. The motor according to claim 8, wherein:

the slit extends from the inward facing sidewall to the outward facing sidewall of the collar at an acute angle relative to a radial line emanating from the axis and passing through the slit.

12. The motor according to claim 8, wherein the slit has opposing walls that are parallel to and face each other.

13. The motor according to claim 8, further comprising:

a liner in the hub in non-rotating engagement with the hub inward facing hub sidewall;

and wherein the liner is in rotational, sliding engagement with the shaft; wherein the liner is of a graphite material and the hub of a stainless steel material;

a first key between the shaft and the first rotor section for causing the first rotor section to rotate with the shaft;

a second key between the shaft and the second rotation section for causing the second rotation section to rotate with the shaft; wherein the first key has a second end terminating at a first end of the liner; and the second key has a first end terminating second end of the liner.

* * * * *